W. S. HUBBARD.
MACHINE FOR AFFIXING MEASUREMENT TICKETS OR OTHER TICKETS TO FABRICS AND THE LIKE.
APPLICATION FILED MAY 8, 1916.

1,309,069.

Patented July 8, 1919.
7 SHEETS—SHEET 1.

Inventor
William Sammons Hubbard
per H. Sefton Jones
Attorney

W. S. HUBBARD.
MACHINE FOR AFFIXING MEASUREMENT TICKETS OR OTHER TICKETS TO FABRICS AND THE LIKE.
APPLICATION FILED MAY 8, 1916.

1,309,069.

Patented July 8, 1919.
7 SHEETS—SHEET 3.

Inventor
William Sammons Hubbard
per J. Sefton Jones
Attorney

W. S. HUBBARD.
MACHINE FOR AFFIXING MEASUREMENT TICKETS OR OTHER TICKETS TO FABRICS AND THE LIKE.
APPLICATION FILED MAY 8, 1916.

1,309,069.

Patented July 8, 1919.
7 SHEETS—SHEET 4.

*Inventor*
William Sammons Hubbard
per. H. Sefton Jones
*Attorney*

Inventor
William Sammons Hubbard
per
Attorney

UNITED STATES PATENT OFFICE.

WILLIAM SAMMONS HUBBARD, OF LEICESTER, ENGLAND.

MACHINE FOR AFFIXING MEASUREMENT-TICKETS OR OTHER TICKETS TO FABRICS AND THE LIKE.

1,309,069.   Specification of Letters Patent.   Patented July 8, 1919.

Application filed May 8, 1916. Serial No. 96,266.

*To all whom it may concern:*

Be it known that I, WILLIAM SAMMONS HUBBARD, a subject of the King of Great Britain, residing at Kent Street Works, Leicester, in the county of Leicester, England, have invented new and useful Improvements in Machines for Affixing Measurement-Tickets or other Tickets to Fabrics and the like, of which the following is a specification.

My invention relates to a machine for applying measurement or other labels at regular intervals along a length of fabric or the like.

My invention relates to improvements in a machine which has been designed for the purpose of applying measurement or other labels at regular intervals along the whole length of fabric or the like in which the timing of the label attaching mechanism is such as to cause a label to be applied to the fabric in each revolution of the measuring drum, said mechanism being operated by the rotation of the drum co-acting with a series of cams to feed forward a series of labels from a roll, to cut the foremost label from the series and bring it in front of a heated plunger and in contact with the fabric through an aperture of the drum surface where it is firmly affixed to the fabric by the plunger.

The machine of my invention has been designed to overcome certain disadvantages which have become apparent from practical experience with the working of this machine. It has been found desirable to so reconstruct the mechanism as to provide a means whereby the label mechanism can be put out of action when desired; for example, if the machine is employed to affix a series of measurement labels on, for example, 100 yard-lengths of fabric, the label strip wound upon the roll will contain sets of labels numbered from 1–100 or 1–50 or 1– any number according to the number of lengths to be measured off upon the fabric. The length of fabric passed over the measuring drum will naturally be rather more than 100 yards in length. It is desirable that the label mechanism is put out of action when a set of labels have been affixed to the cloth, for otherwise the remnant of fabric beyond the desired length will have affixed thereto one or more of the succeeding set of labels fed forward from the roll thus rendering useless this set and necessitating the whole of the set being passed out of the machine before a fresh length of cloth is put through the machine. It is very desirable to arrange the label affixing mechanism in such a position that it can be easily got at and adjusted. In my machine means are provided whereby the label strip length fed forward can be adjusted to allow of labels of varying dimensions being affixed by the same machine. Experience has shown that the timing of the sequence of operations is improved by the employment of stationary inner and outer cam surfaces concentric with the drum shaft, the outer cam surface operating the top pressure plate of the label attaching mechanism, and the internal cam surface operating the knife and label moving mechanism and the bottom block against which the top pressure plate is moved.

My invention is illustrated by way of example in the accompanying drawings, in which—

Fig. 1ª shows a diagrammatic side view of the label attaching mechanism, and a portion of the drum broken away.

Referring now to the drawings:—

Figure 1:
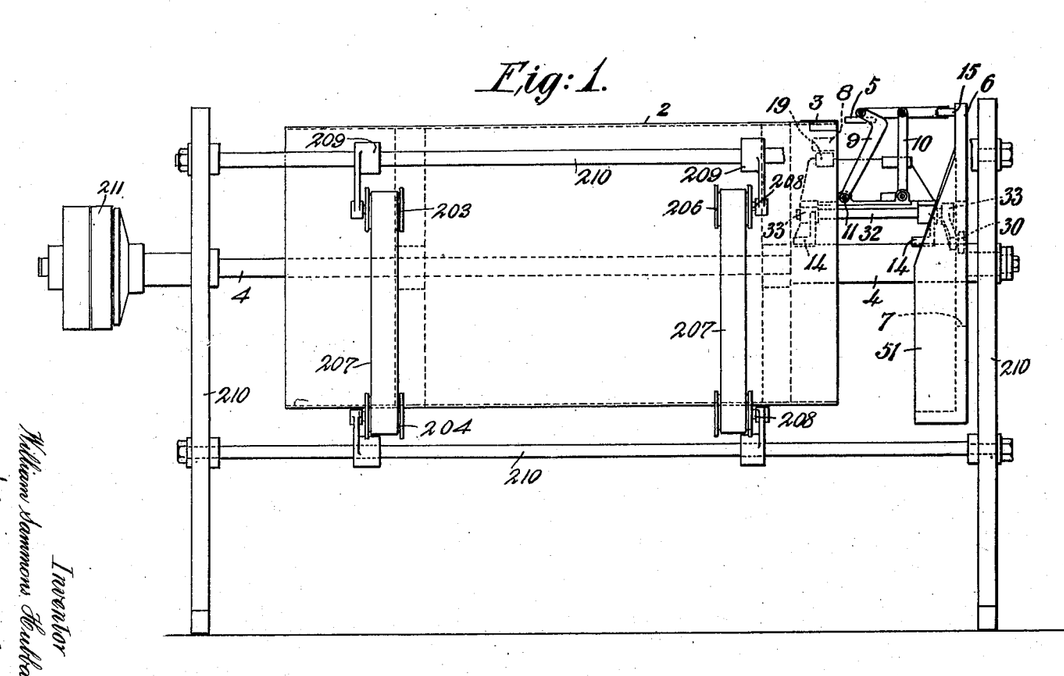
Figure 1 shows a side view of the machine.
Figure 3:
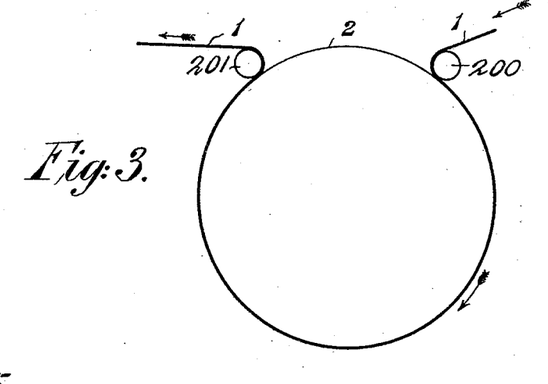
Fig. 3 shows a section of the drum illustrating the path of the material around the drum for a portion of its revolution and then away to the coiling mechanism.
Figure 4:
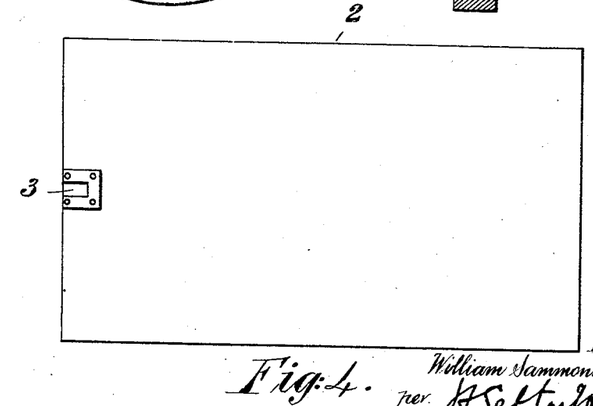
Fig. 4 shows a plan view of the drum showing the small opening through which the tickets are attached.

As shown in Fig. 3, the material is fed to the drum 2 over the roller 200 in the direction of the arrows and passes around the drum for a portion of its revolution and then away over the roller 201 to the coiling mechanism. The material is held against the drum by two endless belts 207 which press against the drum. These belts 207 pass over pulleys 203, 204, 205, 206 which are carried on short shafts 208, mounted on suitable carriers 209 supported on the framework 210 of the machine. The pulleys 205, 206 and their carriers 209 are adjustable so that they can be shifted into suitable positions on the framework 210 according to the widths of material to be passed over the drum. The drum shaft 4 is driven through the driving pulleys 211 from the source of power. The drum 2 is provided on one edge with an opening 3 through which the tickets are attached to the material 1, while the material is over said opening. The whole ticket mechanism illustrated in Figs. 1ª and 2 is carried on the drum shaft 4 and rotates around with the drum at exactly the same speed. As shown in Fig. 1 endwise to the drum a stationary cam 6 is bolted to the framework of the machine. This cam is illustrated in detail in Figs. 5 and 6. The outer cam surface 6 of the said cam is adapted to operate a top pressure plate 5 and ticket feeding mechanism during the rotation of the drum with the ticket attaching mechanism around said cam, while the internal cam 7 is adapted to operate the ticket attaching and cutting mechanism and the bottom block 8. The cam surfaces are so arranged that these mechanisms are timed first to feed the ticket to be attached to a position in which it registers with the opening 3 in the edge of the drum 2, and at the same time to bring the pressure block 5 over and down on the material 1 placed over said opening, at the same time bringing forward a new ticket from the strip and afterward to move the bottom block 8 against the ticket to be attached to said material through said opening 3. The top pressure plate 5 is carried by two pairs of arms 9 and 10 mounted on pivots 11 and 12 carried in bearings in the frame of the machine 13, which is bolted by brackets 14 to the shaft 4 of the measuring drum 2.

Figure 1A:
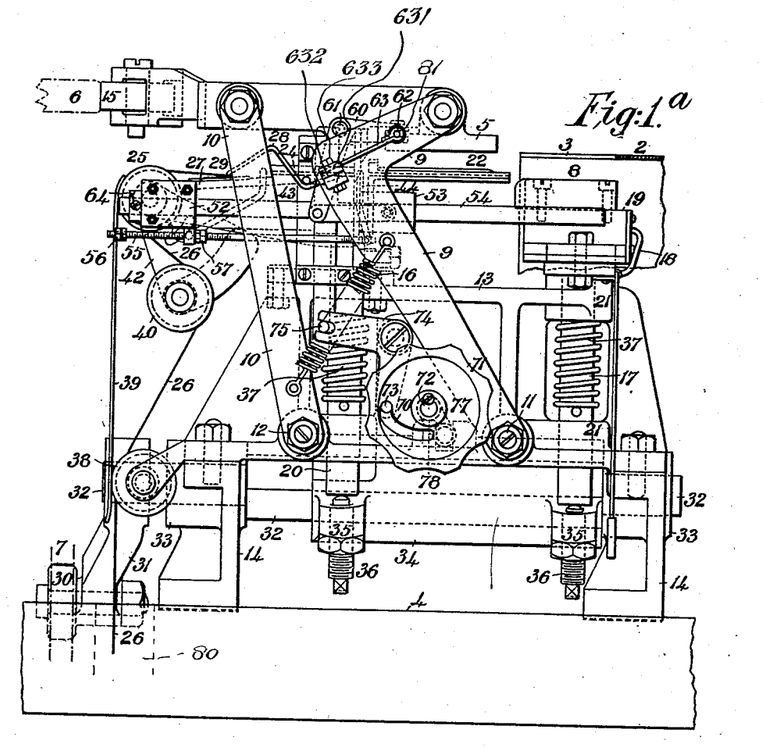
Figure 2:
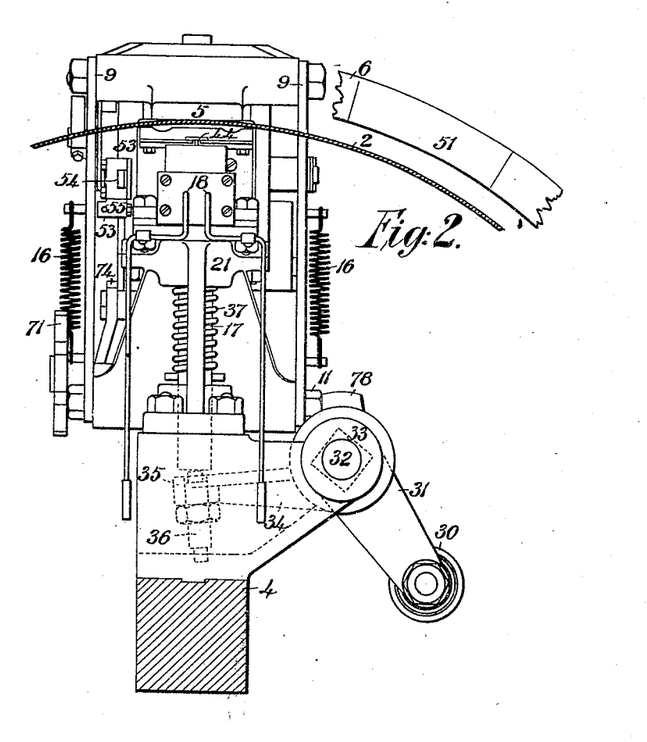
Fig. 2 shows an end view of the mechanism looking at it from the direction of the drum.

The top pressure plate 5 is moved by the cam 6 sidewise over the cloth and the end of the drum 2, by means of the ball bearing roller 15, which is pressed forward in the correct time in the revolution of the drum by the said cam. The top pressure plate 5 in moving sidewise moves in a curved direction with the advantage that in passing over the material in the center of its stroke it is somewhat above it and then closes down on to the top of the material, thus avoiding the possibility of moving or catching the edge of the material, with the liability of pushing it inward along the drum 2. The top pressure plate 5 is returned to its first position shown in Fig. 1ª by means of the side coiled tension spring 16, the ends of which are respectively attached to pivots projecting from the said arms 9 and 10 carrying said pressure plate 5.

It will be readily understood that owing to the positions of the connecting points of the spring 16 in relation to the pivots 11 and 12 of the arms 9 and 10, the movement forward of said pressure plate 5 moves the connecting points of the spring 16 apart; the tension on the spring thus created being such that it holds the ball bearing roller 15 against the cam 6 and returns said pressure plate 5 to its original position. The bottom pressure block 8 is raised by and attached to the plunger 17. Said pressure block 8 is mounted upon an electric heater 19 to which current may be conveniently conveyed by means of the cables 18, these cables being provided with the usual connections for attaching to the supply, which may suitably be brought through the machine by means of brushes working around suitable insulated rings on the machine spindle or drum.

The plunger 17 is mounted in suitable bearings 21 on the frame 13 of the machine. In the frame 13 behind said plunger 17, a second plunger 20 is arranged. The said plunger 20 has attached to its upper end a knife 23, hereinafter described, a front ticket guide 22, and a back ticket guide 24, and the roller 25 over which the ticket strip 26 passes, which is carried by the projecting arm 27. All the above parts are adapted to move with the plunger 20. A spring 28 is carried by the main frame 13 by the set screw 280 and is arranged in such a position that when the plunger 20 is in its lowermost position the end of said spring 28 presses very lightly on a rough pad 29 on the upper surface of said projecting arm 27. When, however, the plunger rises and carries with it the said projecting arm 27 and its pad 29, the pressure against the end of said spring 28 is increased. The ticket strip 26 passes from the roller 25 to the ticket guides 24 and 22 over the pad 29, but under the end of the spring arm 28.

Figure 5:
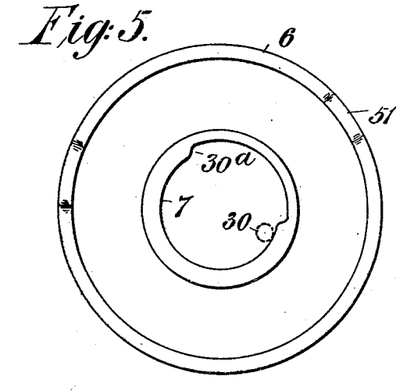
Fig. 5 shows a front view of the cam for operating the label attaching mechanism.
Figure 6:
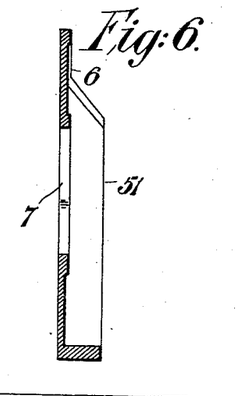
Fig. 6 shows a sectional view of the cam shown in Fig. 5.

The plungers 17 and 20 are given an up and down movement in the frame 13 by means of the ball bearing roller 30, which is in engagement with the internal cam ring 7, shown more particulary in Figs. 5 and 6. The said rocking roller 30 is carried by a rocking lever 31, which is mounted on a spindle 32 which is carried in bearings 33. Between the said bearings 33 the spindle is squared and carries a sliding casting 34 adapted to have an endwise movement along the square portion of the spindle 32. The said casting 34 is provided with lugs 35 in which are mounted adjusting screws or pins 36. These adjusting screws in one position of the sliding casting 34 are brought immediately under the said plungers 17 and 20 and are adapted to press said plungers outward radially from the center of the drum shaft against the influence of spiral springs 37, said springs tending to keep the plungers pressed inward toward the center of the drum shaft 4.

The tickets are coiled upon a drum or spool, (not shown) conveniently mounted on the rotating main spindle or shaft 4 of the drum, and on the opposite side to the ticket attaching mechanism. The ticket strip 26 passes from the spool through an opening 80 in said shaft 4 and from thence between a roller 38 and the lower end of the ticket guide 39, to a roller 40 and from there between the above-mentioned roller 25 mounted at the extremity of the projecting arm 27 and the upper end of the said guide 39, over the pad 29 and under the end of the spring 28 to the ticket guides 24 and 22, between a fixed upper knife 41 and the said movable knife 23 mounted on the upper end of the said plunger 20. The roller 40 is mounted on a weighted lever 42, said lever being pivotally mounted on the spindle of the roller 25. Said weighted lever is adapted to fall by gravity from one to the other of two positions as the drum turns around with the mechanism on the drum shaft 4. Owing to the ticket strip 26 being gripped between the pad 29 and the end of the spring 28 during the time which the roller 40 is falling by gravity from one position to the other, said roller 40 in falling, is drawing off from the main spool a supply of the tickets and owing to the comparatively slow rotation of the drum a loop is formed in the ticket strip slowly and without undue stress. When the ticket mechanism returns to that position in which it is necessary to pass forward to the cloth a fresh ticket, the back needle 43 which is passed into one or other of the holes 50 formed in said ticket, is moved forward in a manner hereinafter described, and draws up the loose loop of the ticket strip. This mechanism avoids any danger of breaking the ticket strip, which would take place if the back needle 43 drew the ticket strip directly off the heavy spool during its rapid movement forward when feeding a fresh length of the ticket through the ticket guides 22 and 24. When the ticket strip is in the machine ready for operation, it rests in said guides 22 and 24 and over the ends of the said back needle 43 and a front needle 44.

The upper side of the ticket strip is provided with an adhesive medium adapted to cause the ticket to adhere to the fabric on the application of heat and pressure.

The movements of the ticket through the guides are illustrated diagrammatically in Figs. 7 to 11.

Figure 7:
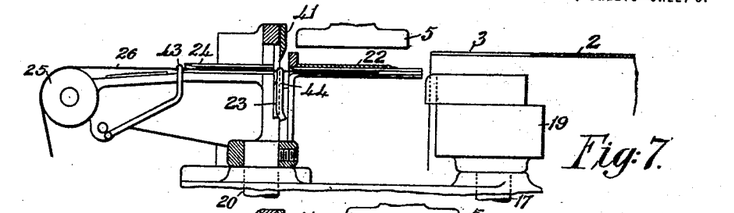
Fig. 7 shows a diagrammatic view of the ticket attaching mechanism and a portion of the drum during that part of the revolution in which the material is not over the ticket opening and the needles are in positions in the ticket strip just ready to feed the same on to the heater block.

In Fig. 7, the ticket attaching mechanism is shown in the position of the drum 2 in which the material is not over the ticket opening 3, while the under knife 23, with the ticket guides 22 and 24 have just moved downward with the plunger 20 after severing from the ticket strip, the ticket length lying in the front guide 22.

Figure 8:
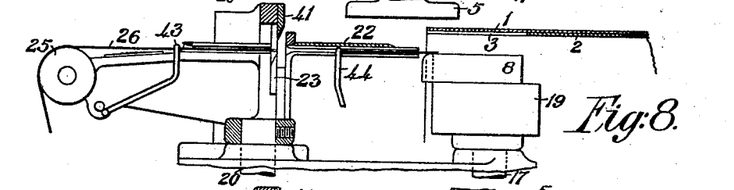
Fig. 8 shows the ticket attaching mechanism in the position in which the cloth or fabric is lying over the opening in the measuring drum with the pressure block starting to move into position over the cloth.

In Fig. 8 the position is shown in which the drum is moved around and the fabric or material is lying over the opening 3. The ticket length which has been cut off from the ticket strip is being moved forward by said front needle 44 underneath the opening 3 in the edge of the drum 2 and under the material 1; and on to the top of the heated block 8. At the same time the top pressure block 5 is being moved forward over the fabric 1.

Figure 9:
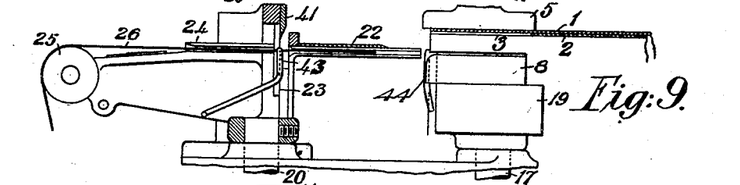
Fig. 9 shows the ticket attaching mechanism in which the pressure block is immediately over the bottom block and is pressing on to or touching the upper surface of the fabric, the ticket on the heater block ready to be attached and a new ticket ready for cutting off.

In Fig. 9, the top pressure block 5 is shown in a position immediately over the heated bottom pressure block 8, and is pressing on to or touching the upper surface of the fabric 1. The ticket has been moved by the front needle 44 to a position on the top of the under block 8 immediately under the opening 3 and the fabric 1, and is about to be immediately attached by the upward movement of said under block 8 against the fabric through said opening 3. At the same time the next ticket length has been moved forward into the front guide 22 by means of the forward movement of the rear needle 43.

Figure 10:
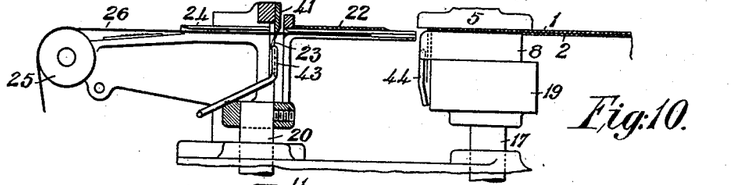
Fig. 10 shows the ticket attaching mechanism in the position in which the heated block has been raised and is pressing the ticket on to the fabric, also the position in which the ticket strip carriers have lifted the tickets clear of the ticket moving needles the knife cutting the new ticket off at the same time.

Fig. 10 shows the position of the attaching mechanism in which the heated block 8 has been raised by the plunger 17 to a position in which it is pressing the ticket on to the fabric 1, while the under knife 23 has been raised by the plunger 20 with the ticket guides 24 and 22 to a position in which it engages the fixed knife 41 and cuts off a second ticket length of the ticket strip 26, which has previously been moved into the said front ticket guide 22. In this position the ticket strip and its guides, will be moved upward by the plunger 20 to a position in which the strip is clear of the ends of the rear and front needles 43 and 44.

Figure 11:
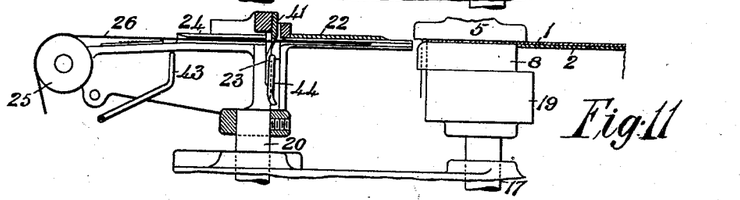
Fig. 11 shows the ticket attaching mechanism in the position in which the ticket moving needles have moved back under the ticket strip to a position in which they are directly under fresh holes in the ticket strip which after being lowered on to the needles will enable them to bring forward another ticket for cutting and attaching.
Figure 12:
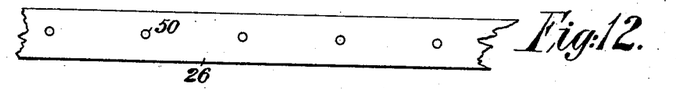
Fig. 12 shows a plan view of a portion of a ticket strip.

In Fig. 11 the position is shown in which the rear and front needles 43 and 44 have moved back under the ticket strip 26 in a manner hereinafter described, so that on the return of the plunger 20 with the under knife 23 and the ticket guides 22 and 24, to the position shown in Fig. 7, the said ticket needles 43 and 44 will pass into fresh holes 50 in the ticket strip 26 and thus be in a position to bring forward another ticket for cutting and attaching to the material during the next cycle of operations. The ticket block 8 is preferably surrounded on three sides by a guide (not shown) which prevents the ticket falling out sidewise when the ticket is pushed out of the guide 22 on to the said block 8.

The said plungers 17 and 20 are moved outward from the center of the drum shaft at the correct time in the revolution of the drum by the roller 30 meeting the inclined portion 30$^A$ of the said operating cam 7 shown in detail in Figs. 6 and 7. As above described, during this upward movement the ticket length is cut off from the strip and is then free to be moved along the guide 22 into a position under the material between the upper pressure block 5 and the under block 8. The lower knife 23 is divided into two parts as it is not necessary that it should extend completely across the ticket strip owing to the series of centrally arranged holes 50, in which the ends of the ticket needles 43 and 44 engage. It is essential that the forward position of the needle 43 shall register exactly with the cutting edges of the knives so that the cut through the ticket strip is exactly across the center of the hole in which the end of said rear needle is in engagement. As shown in Fig. 10, at the moment when the knives are severing a ticket length from the ticket strip the front needle 44 is in the extreme right position against the pressure block 8.

Figure 13:
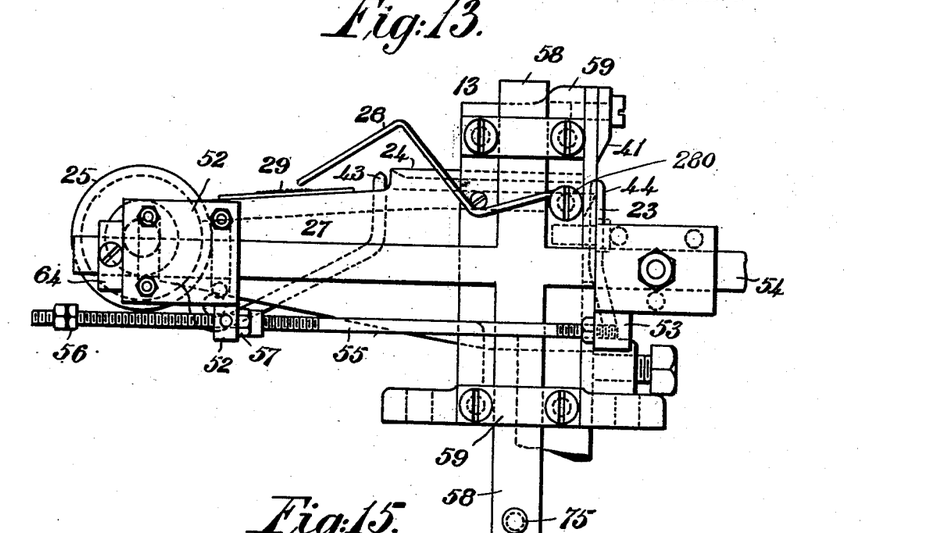
Fig. 13 shows a detail side view of the ticket moving and cutting mechanism.
Figure 14:
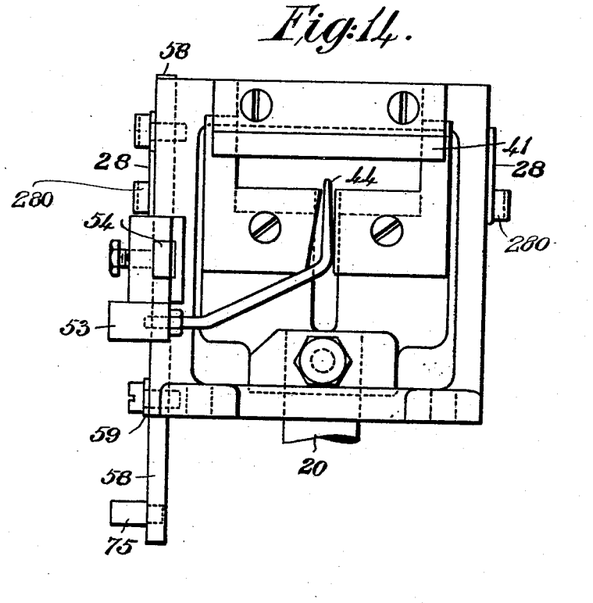
Fig. 14 shows an end view of Fig. 13.
Figure 15:
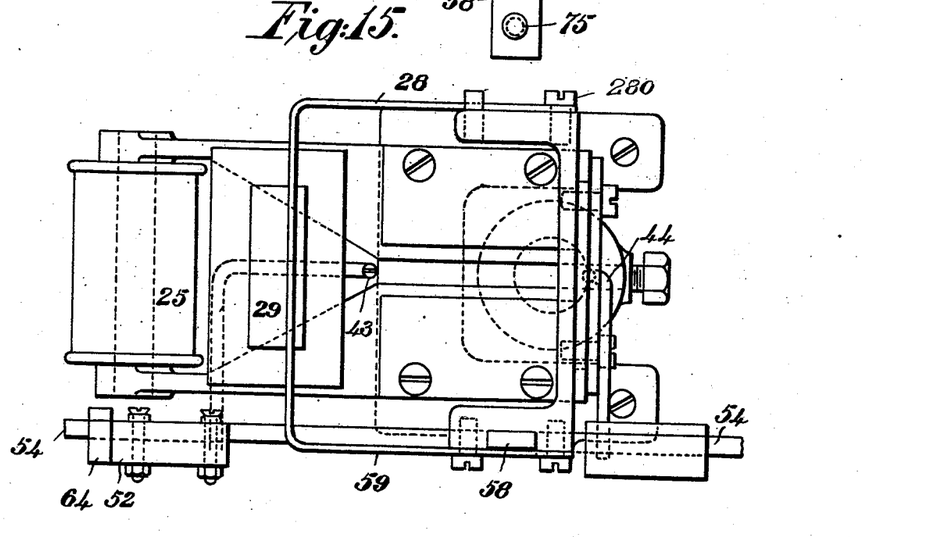
Fig. 15 shows a plan view of Fig. 14.

The mechanism for moving said needles 43 and 44 are shown in detail in Figs. 13, 14 and 15. The rear needle 43 is carried by the block 52 sliding on the end of a bar 54. The front needle 44 is carried on a similar sliding block 53 carried on the other end of the bar 54. The front needle block 53 has attached to it a light adjusting screw 55 which screw passes freely through a hole formed in the rear needle block 52. The said adjusting screw 55 is provided with adjusting nuts 56 and 57, so arranged that the screw can be moved forward through the block 52 for a portion of its length without engaging and moving forward said block. The said bar 54 carrying said blocks 52 and 53 is provided with vertical arms 58 mounted in the guides 59 carried by the frame 13 of the ticket attaching mechanism.

As shown more particularly in Fig. 1$^a$, the front block 53 carrying the front needle 44 is moved along the bar 54 by means of a bell crank lever 60 pivotally mounted on a pin 61 on the frame of the main top pressure block 5. This bell crank lever 60 is connected by a pin 62 to the end of a spring 63 through the opening 81 in the carrying link 9, this opening being larger in diameter than the pin 62 and thus allowing said pin free play in said opening. The spring 63 is attached at its other end to the outer side of said carrying link 9 by means of the clip 631 which is fastened by the bolt 633 to a lug 632 projecting from the link. This arrangement provides for a resilient connection between the bell crank lever 60 and the carrying link 9 and the opening 81 in said link. The arrangement of the spring 63 and the bell crank lever 60 is such that when the top pressure block 5 is in its rearmost position the spring puts a pressure on the block 53 carrying the needle 44 in such a manner that the said block moves through the screw 55 the block 52 at the other end of said screw, against a stop 64 mounted at the end of the stationary bar 54, and at the same time brings said front needle 44 to a position in which it is exactly central with the knives 41 and 23, while the back needle 43 is the same distance behind the front needle as the length of a ticket. This position is shown in Fig. 1$^a$. When, however, the top pressure block 5 with the lever 9 carrying the spring 63 and bell crank lever 60 moves in the opposite direction over the material, passing over the drum, said top pressure block moves forward on the bar 54, the block 53 carrying the front needle 44, and the rod 55 attached to said block 53 until the back adjusting nuts 56 on said rod engage with the rear block 52 and move the said block forward and with said block the rear needle 43. The said blocks 52 and 53 are then moved forward together with their needles until the rear needle 43 is in a position central with the knives 41 and 23, while the front needle 44 is in engagement with the bottom pressure block 8. The distance of movement forward is limited by means of the rear block 52 coming into engagement with the frame of the machine 13 in its foremost position. In the latter position the spring 63 operates through the bell crank lever 60 to hold said rear block 52 against the frame.

The length of the tickets is variable, but the distance between the knives 41 and 23 and the pressing position of the pressure block 5 is constant. Therefore the block 53 carrying the front needle must always move from the center of the knives to the edge of the pressure block 8 whatever the length of the ticket, while the back needle 43 must always move a distance equal to the length between the holes 50 in the ticket strip. It follows that the movement of the said back needle and its block 52 can be adjusted by means of the nuts 57 on the rod 55 so as to move backward the said rear block from the knives a distance equal to the length of the tickets and forward up to the center of the knives. As above described the ticket guides 24 and 22 are attached to the top of the plunger 20 and rise and fall with the knife 23, thus allowing the ticket always to pass over the edge of the bottom knife 23 when fed forward.

In Figs. 13 and 14 the bar 54 carrying the blocks 52 and 53 is shown in its highest position but this bar is capable of being moved into a lower position. The latter movement is not controlled by means of the plungers but by means of a slot 70 on the star wheel 71. The said slot 70 is eccentric to the center of a spindle 72 on which the star wheel is mounted, and is adapted to move a pin 73 mounted at one end of a bell crank lever 74, the other end of which bell crank lever is adapted to move up or down a pin 75, mounted on the lower vertical arm 58 of the bar 54. In this manner the said bar 54 can be raised or lowered by turning the star wheel 71. This movement of the bar 54 allows of the machine running without the operation of the ticket attaching mechanism. The star wheel also moves the screws 36 from beneath the plungers 17 and 20 because the spindle 72 on which said star wheel is mounted is provided with a crank portion 77 adapted to engage between a pair of lugs 78 formed on the square casting 34 carrying the ears 35 in which the said adjusting screws 36 are mounted. When therefore the star wheel is turned to lower the bar 54 and with it the needle blocks and needles, the crank 77 is operated to move the casting through the lugs 78 to a position along the bar 32 in which said screws 36 are clear of the plungers 17 and 20, thus disconnecting the plunger lifting mechanism.

The arrangement of the machine is such that it is not convenient to prevent the backward and forward movement of the top pressure block 5. The backward and forward movement of the said pressure block 5 operates in the manner above described with the backward and forward movement of the needles 43 and 44, but as said needles have been lowered by means of the star wheel 71 they do not engage the holes 50 in the ticket strip and consequently the strip is not drawn forward when it is desired to put the mechanism out of action.

What I claim is:—

1. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, a backing block operated by said cams to move into register with said plunger at the moment of attaching the label to the fabric, feeding mechanism operated by said cams to feed forward under the fabric and over the plunger a label from a roll for each revolution of the drum, cutting mechanism operated by said cams to cut off a label from the ticket roll at each revolution of the drum and means for putting said label affixing mechanism out of action during the rotation of the drum.

2. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, a backing block operated by said cams to bring said backing block into register with said plunger at the moment of attaching the label to the fabric, blocks moved by said cams across the framework of the machine, needles mounted on said blocks adapted to feed forward under the fabric and over the plunger a label from a roll for each revolution of the drum, cutting mechanism operated by said cams to cut off a label from the ticket roll at each revolution of the drum, a bar adapted to carry said movable needle blocks, a vertically movable upright adapted to carry said bar, a hand wheel, and lever and cam mechanism adapted to connect said upright with said hand wheel to allow of said hand wheel moving said feeding needles in or out of the feeding position.

3. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, a backing block operated by said cams to move into register with said plunger at the moment of attaching the label to the fabric, blocks moved by said cams across the framework of the machine, needles mounted on said blocks adapted to feed forward under the fabric and over the plunger a label from a roll for each revolution of the drum, a knife plunger operated by said cams to cut off a label from the ticket roll at each revolution of the drum, a bar adapted to carry said movable needle blocks, a vertically movable upright adapted to carry said bar, a spindle mounted in the framework of the machine, a hand wheel mounted on said spindle, lever and cam mechanism adapted to connect said upright with said hand wheel to allow of said hand wheel moving said feeding needles in or out of the feeding position, a crank connected with said hand wheel and mechanism operated by said crank adapted to connect with or disconnect from the operating cams the knife plunger and label attaching plunger.

4. A machine for applying measurement or other labels or tickets at regular intervals along the whole length of fabric comprising a framework, a drum shaft mounted in bearings in said framework, a drum mounted upon said shaft with an opening in its edge, means for rotating said drum shaft, a stationary cam member concentric with said drum shaft, an outer cam surface on said cam member, an internal cam surface on said cam member, ticket moving mechanism operated by the outer cam surface, a top pressure block operated by said outer cam surface, a knife and a bottom block operated by said internal cam surface, said outer and internal cam surfaces being so positioned that said mechanisms are timed first to cut a ticket length, to feed said ticket into a position in which it registers with said opening in the edge of the drum, and then to bring the top pressure block on to the fabric placed over said opening and finally to bring the bottom pressure block against said ticket to attach it to that portion of the material over said drum opening.

5. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, two pairs of arms pivoted to the framework of the machine, a backing block mounted on and carried by said pairs of arms and adapted to be operated by said cams to move said block in a curved direction in such a manner that it passes over and above the fabric on the measuring drum in the center of its stroke and then closes down onto the fabric at the moment of attaching the label to said fabric, feeding mechanism operated by said cams to feed forward under the fabric and over the plunger a label from a roll for each revolution of the drum, cutting mechanism operated by said cams to cut off a label from the ticket roll at each revolution of the drum and means for putting said label affixing mechanism out of action during the rotation of the drum.

6. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, two pairs of arms pivoted to the framework of the machine, a backing block mounted on and carried by said pairs of arms and adapted to be operated by said cams to move said block in a curved direction in such a manner that it passes over and above the fabric on the measuring drum in the center of its stroke and then closes down on to the fabric at the moment of attaching the label to said fabric, a coiled tension spring connecting said pair of arms on each side of the machine, the connecting points for said springs so positioned in relation to the pivots of said arms that the movement forward of said pressure block moves said connecting points apart and thus creates a tension in said springs tending to hold said pressure block against the operative cam surface, feeding mechanism operated by said cams to feed forward under the fabric and over the plunger a label from a roll for each revolution of the drum, cutting mechanism operated by said cams to cut off a label from the ticket roll at each revolution of the drum and means for putting said label affixing mechanism out of action during the rotation of the drum.

7. A machine for applying measurement or other labels or tickets at regular intervals along the whole length of fabric or the like comprising a measurement drum, means for rotating said drum, a series of cams, a plunger operated by said cams, a spring controlling said plunger, an electric heater mounted on said plunger, a label attaching block mounted on said electric heater adapted to attach a label to the fabric through an aperture in the drum surface on each revolution of said drum, a backing block operated by said cams to move into register with said plunger at the moment of attaching the label to the fabric, feeding mechanism operated by said cams to feed forward under the fabric and over the plunger a label from a roll for each revolution of the drum, cutting mechanism operated by said cams to cut off a label from the ticket roll at each revolution of the drum and means for putting said label affixing mechanism out of action during the rotation of the drum.

8. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, a backing block operated by said cams to move into register with said plunger at the moment of attaching the label to the fabric, feeding mechanism operated by said cams to feed forward under the fabric and over the plunger a label from a roll for each revolution of the drum, a vertically movable plunger mounted in the framework of the machine adapted to be operated by said cams during each revolution of the drum, a spring controlling said plunger, a knife mounted on said plunger, a stationary knife mounted in the framework of the machine in the same vertical plane as said plunger knife, ticket guides adapted to guide the ticket strip across the knives and means for putting said label affixing mechanism out of action during the rotation of the drum.

9. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, a backing block operated by said cams to move into register with said plunger at the moment of attaching the label to the fabric, feeding mechanism operated by said cams to feed forward under the fabric and over the plunger a label from the roll for each revolution of the drum, a spindle mounted in the framework of the machine, a rocking lever mounted on said spindle, a roller carried by said rocking lever adapted to be operated by said cams, a vertically movable plunger mounted in the framework of the machine adapted to be operated by the rocking lever during each revolution of the drum, a spring controlling said plunger, a knife mounted on said plunger, a stationary knife mounted in the framework of the machine in the same vertical plane as said plunger knife, ticket guides adapted to guide the ticket strip across the edge of the knives, and means for putting said ticket attaching mechanism out of action during each revolution of the drum.

10. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, a backing block operated by said cams to move into register with said plunger at the moment of attaching the label to the fabric, feeding mechanism operated by said cams to feed forward under the fabric and over the plunger a label from the roll for each revolution of the drum, a vertically movable knife plunger mounted in the framework of the machine, a spindle mounted in bearings in the framework of the machine of square section between its bearings, a sliding casting mounted on said square section, a pair of lugs projecting from said casting, adjusting screws in said lugs, a rocking lever mounted on said spindle, a roller carried by said rocking lever adapted to be operated by said cams, a spindle mounted in the framework of the machine at right angles to said rocking lever spindle, a hand wheel mounted on said spindle, a crank connected to said hand wheel and engaging in a slot in said casting and adapted to move said casting to an operative position in which the adjusting screws are under said plungers or to a position in which said screws are out of alinement with said plungers, springs controlling said plungers, a stationary knife mounted in the framework of the machine in the same vertical plane as said plunger knife, ticket guides adapted to guide the ticket strip across the edge of the knives and means for putting said label attaching mechanism out of action during the revolution of the drum.

11. A machine for applying measurement or other labels or tickets at regular intervals along the whole length of fabric or the like comprising a measurement drum, means for rotating said drum, a series of cams, a plunger operated by said cams and adapted to attach a label to the fabric through an aperture in the drum surface on each revolution of said drum, means for heating said plunger, a backing block operated by said cams to move into register with said plunger at the moment of attaching the label to the fabric, a vertically movable knife plunger mounted in the framework of the machine, a spindle mounted in bearings in the framework of the machine of square section between its bearings, a sliding casting mounted on said square section, a pair of lugs projecting from said casting, adjusting screws in said lugs, a rocking lever mounted on said spindle, a roller carried by said rocking lever adapted to be operated by said cams, a spindle mounted in the framework of the machine at right angles to said rocking lever spindle, a hand wheel mounted on said spindle, a crank connected to said hand wheel and engaging in a slot in said casting and adapted to move said casting to an operative position in which the adjusting screws are under said plungers or to a position in which said screws are out of alinement with said plungers, springs controlling said plungers, a stationary knife mounted in the framework of the machine in the same vertical plane as said plunger knife, ticket guides adapted to guide the ticket strip across the edge of the knives, blocks moved by said cams across the framework of the machine, needles mounted on said blocks adapted to feed forward under the fabric and over the plunger a label from a roll for each revolution of the drum, a bar adapted to carry said movable needle blocks, a vertically movable upright adapted to carry said bar, lever and cam mechanism adapted to connect said upright with said hand wheel to allow of said hand wheel moving said feeding needles in and out of the feeding position.

12. A machine for applying measurement or other labels or tickets at regular intervals along the whole length of fabric or the like, comprising a measurement drum, means for rotating said drum, a series of cams, a plunger operated by said cams and adapted to attach a label to the fabric through an aperture in the drum surface on each revolution of said drum, means for heating said plunger, a backing block operated by said cams to move into register with said plunger at the moment of attaching the label to the fabric, a knife plunger operated by said cams to cut off a label from the ticket roll at each revolution of the drum, a projecting arm carried by said knife plunger, a rough pad mounted on said projecting arm, a spring arm mounted in the framework of the machine adapted to engage said rough pad, blocks moved by said cams across the framework of the machine, needles mounted on said blocks adapted to feed forward a label from a roll over said rough pad and under said spring arm and under the fabric and over the plunger for each revolution of the drum, said label being held in a stationary position by the spring arm against the pad during a portion of the revolution of the drum, a bar adapted to carry said movable needle blocks, a vertically movable upright adapted to carry said bar, a spindle mounted in the framework of the machine, a hand wheel mounted on said spindle, lever and cam mechanism adapted to connect said upright with said hand wheel to allow of said hand wheel moving said feeding needles in and out of the feeding position, a crank connected with said hand wheel and mechanism operated by said crank adapted to connect with or disconnect from the operating cams the knife plunger and label attaching plunger.

13. A machine for applying measurement or other labels or tickets at regular intervals along the whole length of fabric or the like, comprising a framework, a drum shaft mounted in bearings in said framework, a measurement drum mounted on said drum shaft, means for rotating said drum, a series of cams, a plunger operated by said cams and adapted to attach a label to the fabric through an aperture in the drum surface on each revolution of said drum, means for heating said plunger, a backing block operated by said cams to move into register with said plunger at the moment of attaching the label to the fabric, a knife plunger operated by said cams to cut off a label from the ticket roll at each revolution of the drum, a projecting arm carried by said knife plunger, a rough pad mounted on said projecting arm, a spring arm mounted in the framework of the machine adapted to engage said rough pad, blocks moved by said cams across the framework of the machine, needles mounted on said blocks adapted to feed forward a label from a roll over said rough pad and under said spring arm and under the fabric and over the plunger for each revolution of the drum, said label being held in a stationary position by the spring arm against the pad during a portion of the revolution of the drum, a bar adapted to carry said movable needle blocks, a vertically movable upright adapted to carry said bar, a spindle mounted in the framework of the machine, a hand wheel mounted on said spindle, lever and cam mechanism adapted to connect said upright with said hand wheel to allow of said hand wheel moving said feeding needles in and out of the feeding position, a crank connected with said hand wheel, mechanism operated by said crank adapted to connect with or disconnect from the operating cams the knife plunger and label attaching plunger, a weighted lever mounted on said projecting arm, a guiding roller carried by said weighted lever adapted to guide the label strip from the roll, said weighted lever being adapted to fall by gravity from one to the other of two positions as the measuring drum turns with the ticket attaching mechanism on the drum shaft.

14. A machine for applying measurement or other labels or tickets at regular intervals along the whole length of fabric or the like, comprising a measurement drum, means for rotating said drum, a series of cams, a plunger operated by said cams and adapted to attach a label to the fabric through an aperture in the drum surface on each revolution of said drum, means for heating said plunger, two pairs of arms pivoted to the framework of the machine, a backing block mounted on and carried by said pairs of arms operated by said cams to move into register with said plunger at the moment of attaching the label to the fabric, blocks moved by said cams across the framework of the machine, needles mounted on said blocks adapted to feed forward over the fabric and under the plunger a label from a roll for each revolution of the drum, a knife plunger operated by said cams to cut off a label from the ticket roll at each revolution of the drum, a bar adapted to carry said movable needle blocks, a bell crank lever pivotally mounted on the framework of the backing block, a link connecting one end of said bell crank lever with the block carrying the front needle, a spring connecting the free end of said bell crank lever with one of the front pair of arms carrying the backing block, a vertically movable upright adapted to carry said bar, a spindle mounted in the framework of the machine, and means for putting said label affixing mechanism out of action during the rotation of the drum.

In testimony whereof I sign my name to the specification in the presence of two subscribing witnesses.

WILLIAM SAMMONS HUBBARD.

Witnesses:
 THOS. W. JONES,
 H. S. MARTIN.

Copies of this patent may be obtained for five cents each, by addressing the "Commissioner of Patents, Washington, D. C."